Aug. 18, 1953

H. R. OWEN ET AL 2,648,925

SIGN STRUCTURE

Filed May 6, 1948

INVENTORS.
HAROLD R. OWEN
RALPH BROWN
BY THEIR ATTORNEYS.
HARRIS, KIECH, FOSTER & HARRIS
BY
Ward D. Foster Aug. 18, 1953 H. R. OWEN ET AL 2,648,925
SIGN STRUCTURE
Filed May 6, 1948 5 Sheets-Sheet 2

INVENTORS.
HAROLD R. OWEN
RALPH BROWN
BY THEIR ATTORNEYS.
HARRIS, KIECH, FOSTER & HARRIS

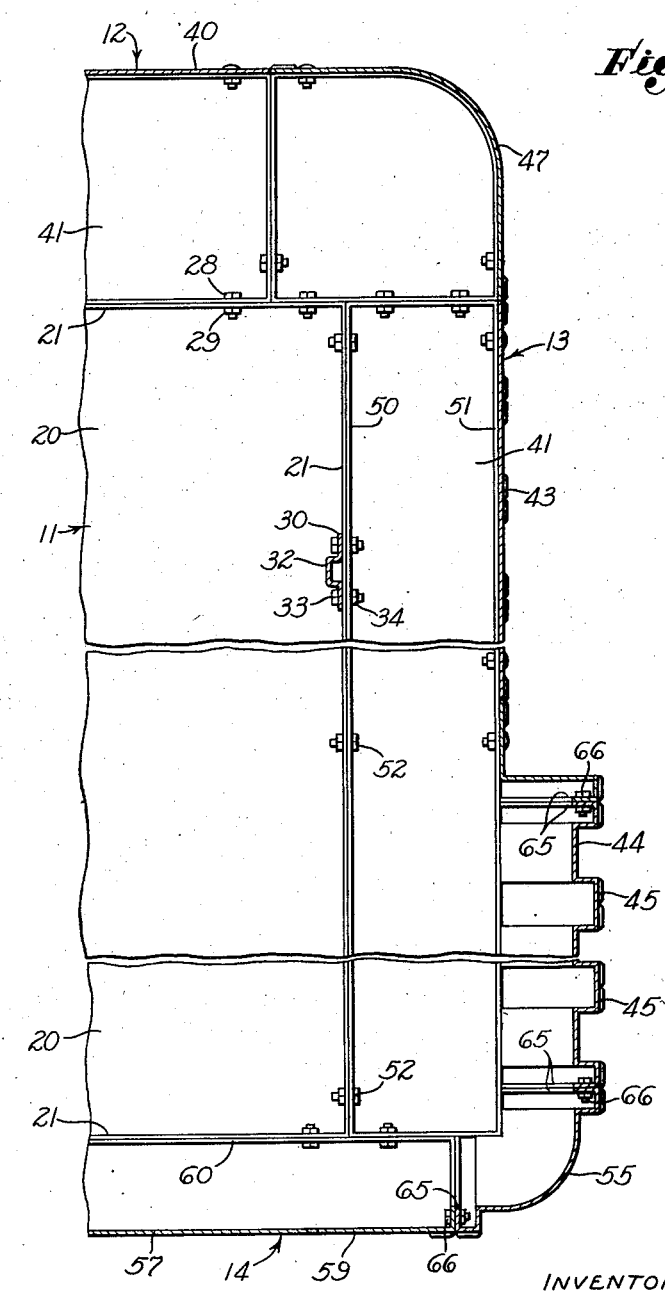

Aug. 18, 1953  H. R. OWEN ET AL  2,648,925
SIGN STRUCTURE
Filed May 6, 1948  5 Sheets—Sheet 4

INVENTORS.
HAROLD R. OWEN
RALPH BROWN
BY THEIR ATTORNEYS.
HARRIS, KIECH, FOSTER & HARRIS
BY
Ward W. Foster INVENTORS.
HAROLD R. OWEN
RALPH BROWN
BY THEIR ATTORNEYS.
HARRIS, KIECH, FOSTER & HARRIS
BY Patented Aug. 18, 1953

2,648,925

UNITED STATES PATENT OFFICE 2,648,925

SIGN STRUCTURE

Harold R. Owen, Playa Del Rey, and Ralph Brown, Fall Brook, Calif., assignors to Electrical Products Corporation, Los Angeles, Calif., a corporation of California Application May 6, 1948, Serial No. 25,328

4 Claims. (Cl. 40—130)

This invention relates generally to sign structure and particularly to a sign structure of a hollow box-like type adapted to be supported on and to project from the side of a building or other vertical support.

A primary object of the invention is to provide a sign structure, of the character referred to, composed of a plurality of elements capable of being assembled to form signs of various widths and heights in accordance with the requirements and in which the elements may comprise face panels each having a perimetrical flange adapted to be connected to the corresponding flanges of adjacent panels to construct the sides of the sign, the side assemblies thus produced being reinforced by the connected flanges which are disposed within the structure and which provide, in effect, crossing stiffeners which greatly strengthen the self-sustaining side members and effect great rigidity so as to prevent buckling of the sides when the latter are subjected to high velocity winds.

Another object is to provide bracing or spreading means for holding the side members in spaced relationship. This object is best attained by providing brace members or spreaders which are bolted to the flanges of opposite side wall panels to form, in effect, spacers therebetween, the brace members being preferably of a structural shape, such as channel shape, so that they possess great inherent strength and resist bending.

Another object is to provide a sign of the type specified in which the top, front, and bottom openings of the sign structure are closed by border members having flanges which are bolted to outermost flanges of the side members so as to complete the box-like structure.

Another important object of the invention is to provide a sign structure, of the character referred to, in which the panels of the side members and the individual border elements are constructed as castings of light-weight metal, such as aluminum alloy, so that their outer exposed surfaces can be suitably embossed, fluted or otherwise embellished or shaped to produce a three-dimensional effect which adds greatly to the appearance of the sign as a whole and tends to draw the attention of persons passing the sign. The border elements, being made as castings, possess inherent strength and thus serve to add rigidity to the structure so that the sign is adequately braced without the use of a heavy and complicated framework such as is employed in conventional signs wherein the sides are built up from sheet metal parts having little, if any, inherent rigidity.

Another object is to provide a sign of the character referred to in which the outer surfaces of the cast face panels are formed with checks, flutes, or other markings which serve to diffuse the light which is directed thereagainst by the illuminating means so that sharp and well defined sign characters are produced and the appearance of the sign greatly improved. It is another object in this respect to provide a sign in which the surface markings on the face panels form a background field giving a mat effect to the light rays, thus allowing any smooth, depressed, level, or raised characters to be contrastingly more brilliantly illuminated.

Another object is to provide a sign of the type indicated which embodies means by which the sign can be readily secured to the wall of a building or other vertical surface, this means preferably consisting of hanger members bolted to certain of the brace members or spreaders and projecting rearwardly from the sign structure to be connected to angle irons or other bracket means on the building. By this means, the sign can be conveniently mounted on and removed from the vertical support and the mounting means is greatly simplified.

Another object is to provide a sign which is extremely simple in construction, one which can be quickly assembled from prefabricated panels and border elements in a wide variety of sizes and shapes, one which is especially strong and durable, and one which conveys the appearance of being massive and yet is comparatively light in weight.

Another object of the invention is the development of component units which may be not only manufactured more economically, but which may be also distributed more economically than is the present custom. The present custom assembly units, with contiguous reinforcing flanges, permit inexpensive packaging and shipment without longitudinal frame members, such as are ordinarily used in sign construction. Assembly is made locally by dealers, thus permitting the sign industry for the first time to follow the same practices of other successful industries, namely, centralized manufacture and local retail distribution, as differentiated from the present custom in the sign industry of local manufacture through uneconomic hand processes.

Another object is to provide a sign in which the illuminating tubes can be disposed at both sides of the raised portions so as to produce an illuminated outline for the sign character, the relation between the raised portions and the tubes being such that a minimum amount of light is directed onto or into the sign character between the tubes so that the letter outline remains sharp and distinct and the merging of the light rays to give the appearance of a wide sign character is avoided.

Further objects of the invention will be apparent from the following detailed description and from the drawings, which are intended for the purpose of illustration only, and in which:

Fig. 6 is a vertical sectional view of the lower, outer corner of the sign;

Figure 1:
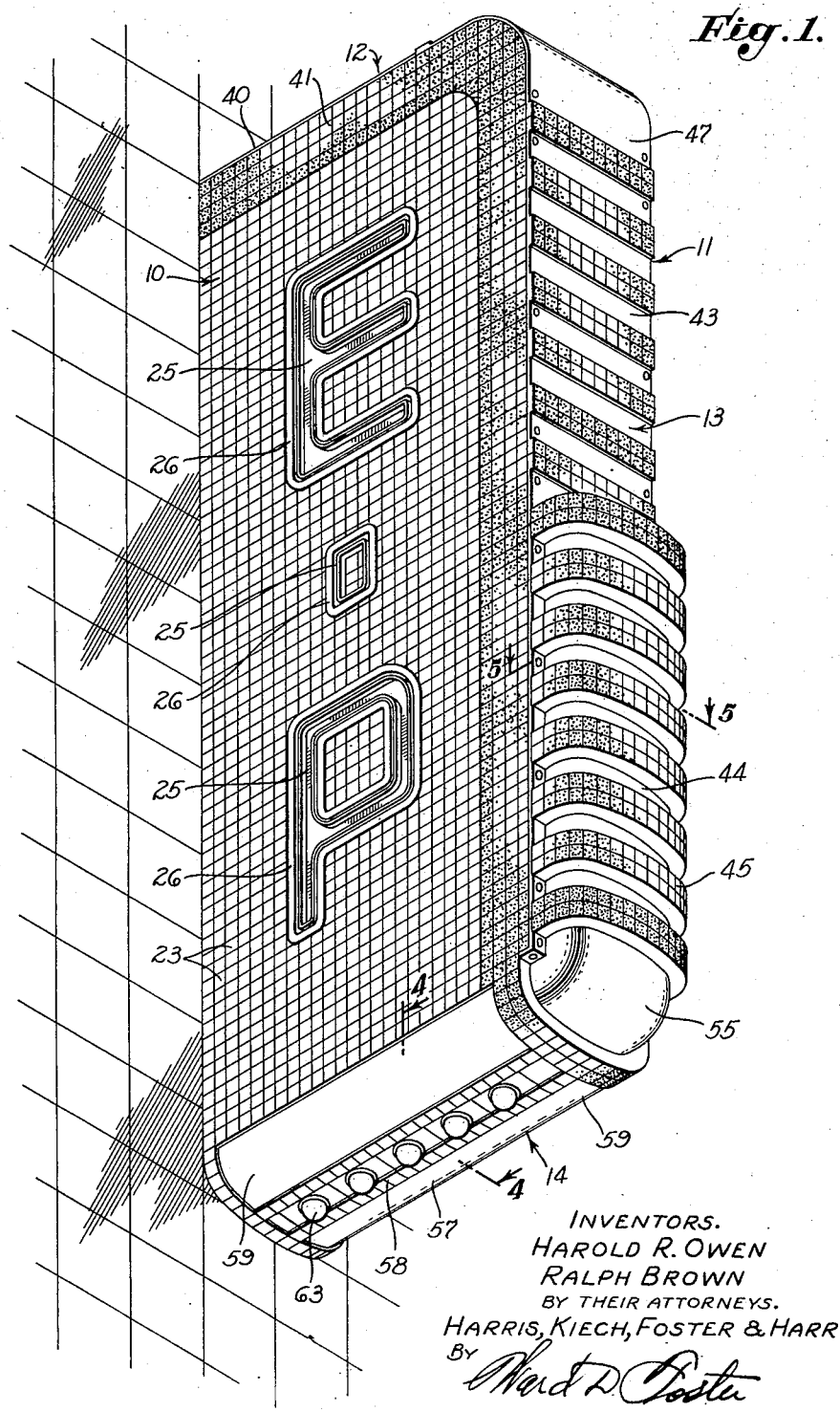
Fig. 1 is a perspective view of an illuminated sign constructed in accordance with the present invention.

Referring to the drawings in detail, the improved sign is herein shown as adapted for mounting against the outer surface of a building, the sign being of box-like form and including opposite side or display members 10 and 11, a top wall 12, a front wall 13, and a bottom wall 14.

The side members 10 and 11 may be of any desired shape, Fig. 1 showing these members as embodied in a substantially rectangular shape, by way of example. Each side member 10 and 11 is composed of a plurality of individual side or face panels 20 which are preferably, although not essentially, of rectangular shape. In accordance with this invention, the panels 20 are cast from light-weight, non-corrosive metal and each is provided with a peripheral flange 21 which defines the border thereof and which projects at right angles to the plane of the panel at one side thereof. The flanges 21 of the panels are provided with a series of apertures 22 (Fig. 2) which are used for the purpose to be presently explained.

While the panel elements 20 may have plain outer surfaces, it is within the concept of this invention to provide these surfaces with either depressions or embossed portions during the molding or casting of the elements so as to add to the attractiveness of the sign and provide a third-dimensional effect. The panels shown in Fig. 1 are illustrated, by way of example, as embossed with small squares or "pillows" 23 which together provide a checker design, this design tending to conceal the lines of joining between the several panels. The outer surfaces of the face panels 20 are preferably coated with vitreous enamel, baked to a hard, smooth, and lustrous finish.

Certain of the panels 20 may be cast with raised stroke portions 25 of any desired configuration intended to represent the letters or other chosen sign characters. Disposed in or surrounding and following the outline of the recesses 25, are electric luminescent tubes 26 which are mounted in any suitable manner and which are suitably connected in an electrical circuit. When the tubes 26 are lighted, the surfaces of the recessed portions 25 serve to reflect or silhouette the sign character.

The individual cast face panels 20 are assembled to produce the side members 10 and 11 by placing the panels upon a smooth horizontal surface with their flanges 21 projecting upwardly. The flanges 21 of each panel 20 are connected to the adjoining flanges of adjacent panels by means of bolts 28 which pass through aligned apertures 22 of the flanges, nuts 29 being screwed onto the threaded ends of the bolts, as shown best in Fig. 3, to retain the several panels in connected side-to-side relationship. The joining of the panels 20 is continued in this manner until an assembly of the desired size and shape is produced. The abutting flanges 21 of the several panels form, in effect, crossing ribs on the inner surfaces of the side members 10 and 11 and by this means the members are adequately braced and reinforced. The members 10 and 11 are thus made self-sustaining and, because they are cast instead of being fabricated from sheet metal, they possess considerable inherent strength and will not bend or flex to any appreciable amount when the sign is subjected to high winds and other atmospheric conditions. Because of this fact, there is little or no tendency for the vitreous enamel or other coating to crack during normal use of the sign and the cost of servicing the sign is maintained at a minimum.

The side members 10 and 11, made up of the face panels 20, are held in spaced, parallel relationship by means of spreaders or bracing members 30 and 31. The spreaders 30 consist of strips of sheet metal having a central, longitudinally extending offset rib 32 so that the spreaders are, in effect, substantially channel shape in cross section and thus resist bending or other distortion. The spreaders 30 have pairs of apertures adjacent their ends which are adapted to align with any two adjacent apertures 22 of the flanges 21 of the side members 10 and 11, and are connected to the flanges by bolts 33 and nuts 34. The spreaders 31 are similar to the spreaders 30 but are made somewhat wider and provided with a pair of the longitudinal ribs 32. The spreaders 31 are connected between the side members at points where maximum stress is apt to occur, and are secured in place by the bolts 33 and nuts 34. It is thus seen that the side members 10 and 11 are maintained in spaced, parallel relationship by the spreaders 30 and 31 which may be arranged at any desired locations therebetween.

Figure 2:
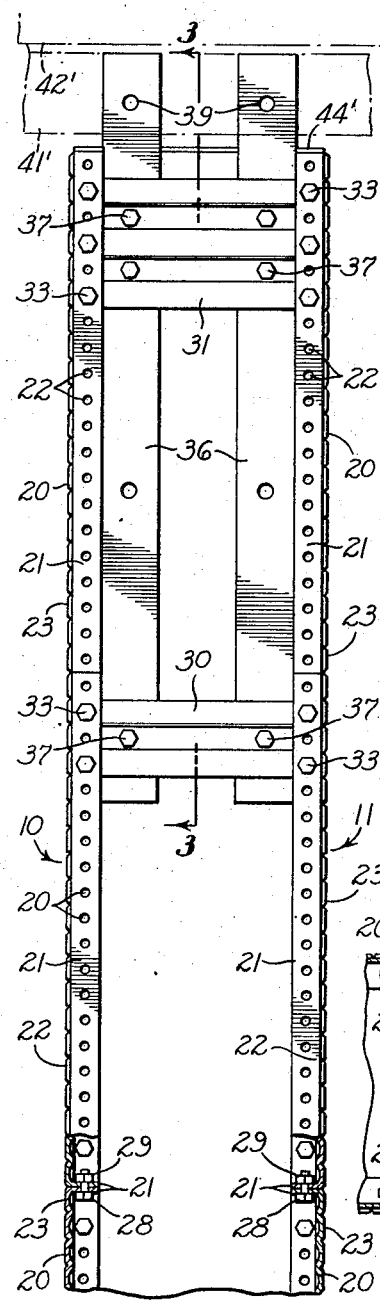
Fig. 2 is a plan view of the sign structure with the upper border member removed to disclose the internal construction.
Figure 3:
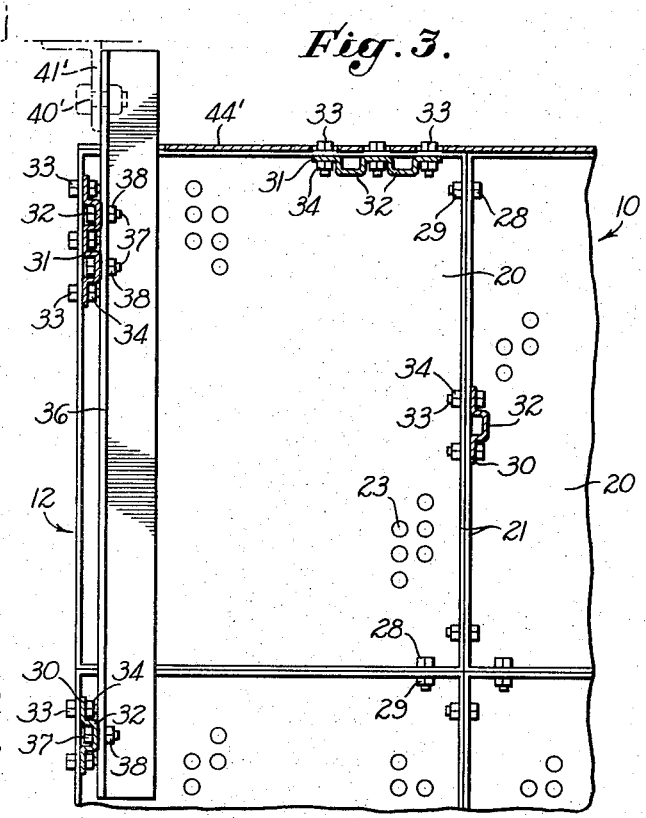
Fig. 3 is a sectional view, taken on line 3—3 of Fig. 2.

As mentioned previously, the sign is adapted to be mounted against the wall of a building or other vertical surface, and the present invention contemplates the provision of means, incorporated in the sign structure for so mounting the sign. Referring to Figs. 2 and 3, a pair of angle-bars 36 are secured to the channel portions of ribs 32 of adjacent spreaders 30 and 31, at the upper end of the sign structure, by means of bolts 37 and nuts 38. The angle-bars 36 constitute hanger members and have their outer ends projecting rearwardly from the sign structure and provided with holes 39 for receiving bolts 40', or other fastening means, by which the bars are connected to angular brackets 41' mounted on the side 42' of the building. Similar hanger members may also be provided at the lower end of the sign to provide maximum support for the sign. When it is desired to pivotally connect the sign to the side of the building, a single angle-bar may be secured to both the upper and lower ends of the sign structure and in this case, the attaching bolts 40' serve as the pivotal connection. The rearward side of the sign structure may be closed by means of a sheet metal plate 44' secured to the vertical flanges 21 of the rearmost face panels 20 of the side members 10 and 11.

The box-like sign is completed by applying ornamental elements to the open top, front and bottom thereof to form the rim or border of the sign. In accordance with the present invention, the border comprises a plurality of independent ornamental elements which are preferably made as castings of light-weight metal but which may be molded from plastic elements if desired. The individual components of the border may be made relatively flat or of concavo-convex or of other cross-sectional shape, the particular contour selected depending largely upon the overall size, shape, and other characteristics of the sign to be produced. In any event, the border elements preferably have embossed outer surfaces so that a third dimensional effect is produced and the appearance of the sign as a whole is greatly enhanced. Preferably, the outer surfaces of the border elements have crossing lines so as to harmonize with the design of the face panels 20 of the side members 10 and 11 and conceal the adjoining edges of the elements or the seam therebetween.

While the various components of the border can be of any desirable shape and arranged in any particular manner, Fig. 1 shows the border as comprising a plate-like element 40 which is employed for closing the top of the sign structure. This element may have its longitudinal edges bolted directly to the upper flanges 21 of the side members 10 and 11 or to intermediate border or spacer members 41, to be later described. The front of the sign may be composed of border sections or elements of different types, Fig. 1 showing it as including an upper element 43 and a lower element 44. The border element 43 is made in the form of a plate having longitudinally spaced, transverse, ribs or stripes. This element may be bolted directly to the vertical flanges 21 of the side members 10 and 11 or to the spacer members 41.

Figures 4, 5:
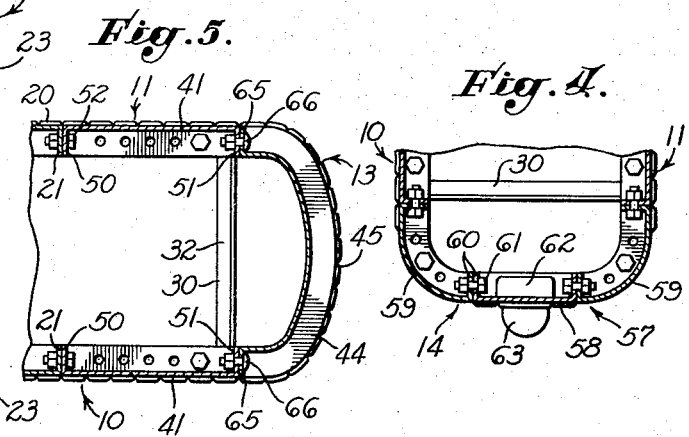
Fig. 4 is a cross-sectional view, taken on line 4—4 of Fig. 1.
Fig. 5 is a cross-sectional view, taken on line 5—5 of Fig. 1.

The lower border element 44 is concavo-convex in cross section and, as shown in Figs. 1 and 5, has longitudinally-spaced transverse ribs 45, also of concavo-convex shape. As shown in Fig. 5, the element 44 is bolted to the spacer members 41 but, if preferred, it may be similarly secured to the forward edges of the side members when the spaced members are not employed.

Disposed between the top border element 40 and the element 43 is a curved element 47 which forms the upper forward corner of the sign and which is also cast from light-weight metal. The corner element 47 may be bolted or otherwise secured to the spacer members 41. The spacer member 41, which may be made in sections, is cast in the form of a channel, as best shown in Fig. 5, so as to provide inner and outer flanges 50 and 51, the inner flange having holes therein adapted to align with the holes in the forward vertical flanges 21 of the side members and adapted to receive bolts 52 which secure the spacer members to the flanges of the side members 10 and 11. The border elements are bolted directly to the outer flanges 51 of the spacer member sections.

The lower forward corner of the sign is closed by an arcuate border element 55 which has rib-like flanges at its ends which abut the ribbed end portions of the border element 44 and a cast border element 57 which forms the bottom of the sign. The element 57 is substantially channel shape and, as shown in Fig. 4, may comprise a central plate-like section 58 and upstanding arcuate sections 59, these parts having flanges 60 which are held in abutting relationship by bolts 61. The flanges 60 at the upper ends of the sections 59 are bolted to the flanges 21 at the lower ends of the side members 10 and 11. The central section 58 is formed with socket portions 62 in which electric lamps (not shown) are held, the lamps being enclosed by dome-shaped globes 63. If preferred, the sections 58 and 59 may each be composed of a series of individual flanged panels bolted together to provide a border element 57 of the required length and width. Likewise, the other border elements can be made up of cast sections bolted together to make a sign of appropriate size as regards height, width and thickness. Preferably, the various border elements have inwardly directed flanges 65 at their ends, the flanges of adjacent elements being held in abutting relation by means of bolts 66, as shown in Fig. 6. It will be apparent that the several panels and border elements, previously described, may have their outer surfaces provided with designs other than those herein shown, the present invention not being limited in this respect.

It will be observed from the foregoing that the present improved sign comprises a box-like shell, commonly referred to in the art as a "can," which is composed of a plurality of individual cast metal panels so constructed and assembled that they provide self-sustaining structural units or side members, these members being held in spaced relationship by means of bracing members or spreaders. The edge or border of the sign is composed of a plurality of cast metal elements which can be assembled in various ways to produce a border which not only will harmonize with the store front or other building, but which will produce a third dimensional effect so necessary to maintain the architectural beauty of the building. It is pointed out that the outer surfaces of the various sign components may be suitably embossed during the casting thereof so as to produce a large variety of designs. Preferably, these surfaces are coated with vitreous or porcelain enamel of desired colors so as to further enhance the appearance of the electrical advertising display and greatly reduce the upkeep of the sign by eliminating periodic painting of the sign. While it is true that the side panels might be made as sheet metal stampings, it is particularly pointed out that such stampings would possess very little inherent strength and a side member composed of such sheet metal parts would not, therefore, be self-sustaining. On the other hand, in the present improved sign structure, components of the side members, being made from cast metal, constitute structural elements capable of withstanding considerable stresses and strains. It is therefore apparent that the present sign requires no internal supporting framework such as is used in conventional signs wherein the sheet metal side members require structural reinforcement or backing.

It has been explained that the external faces of the ornamental components of the sign may be of any desired configuration, such as checkered, fluted, etc. In any event, it is an important feature of the invention to so space the bolt holes of the various components that the center-to-center distance between the holes is equal to or is a multiple of the spacing between the checkered or fluted designs. By this provision, all the components, when assembled by bolts or other fastening means passing through the aligned holes, are disposed in a manner such that their checks or flutes together provide continuous design surfaces. It is apparent, therefore, that by spacing the design shapes of the components in multiples of the distance between bolt holes, a smooth, unbroken, external surface, free from unsightly seams between the parts, is provided.

Figure 8:
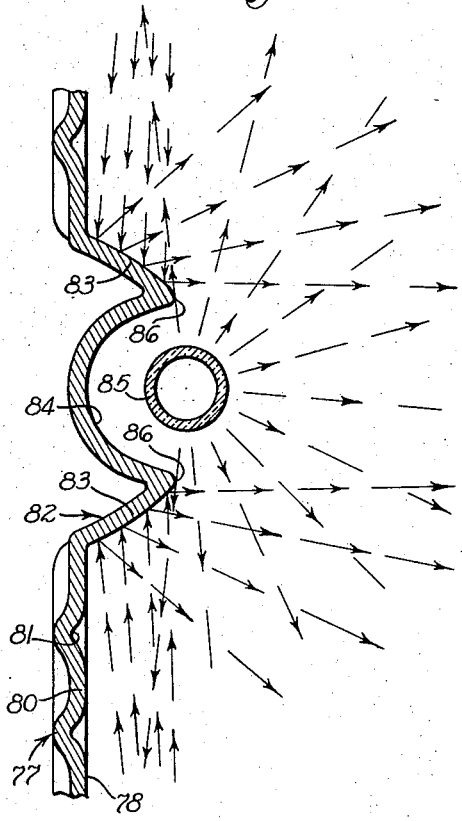
Fig. 8 is a cross-sectional view, taken on line 8—8 of Fig. 7.
Figure 7:
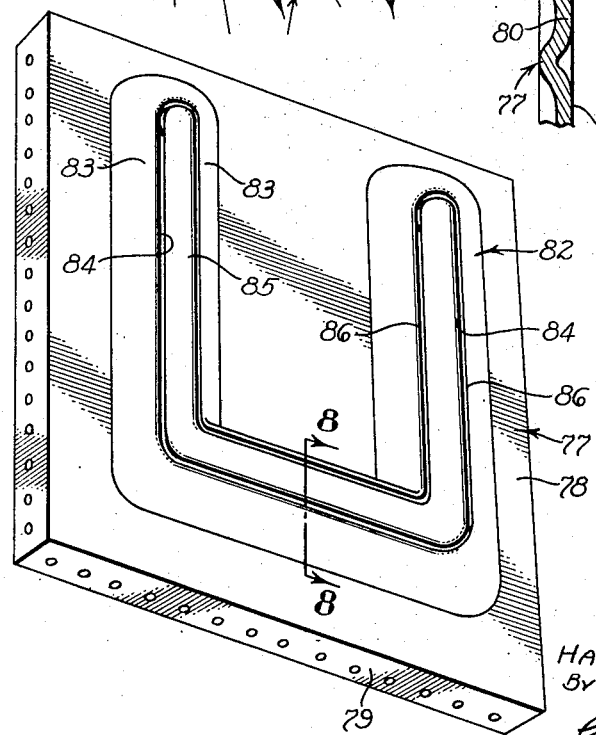
Fig. 7 is a perspective view of a modified face panel used as one of the components of the side members of the sign, the panel having a sign character formed thereon for receiving an illuminating tube.

Referring now to Figs. 7 to 11 of the drawings, the present invention further contemplates the provision of an electrically illuminated sign in which sign-character panels of unique form are incorporated. Such a panel 77 is illustrated in Fig. 7 as comprising a flat face portion 78 and a peripheral flange 79, the panel being preferably rectangular in shape and cast from light-weight metal. The face portion 78 may be plain as shown in Fig. 7 or may be provided with crossing depressions which form, in effect, a field or mat of alternate light-reflecting pillows 80 and recesses 81 (Fig. 8) which together serve to diffuse light projected upon the panel from the lighting elements of the sign or from nearby sources of light, such as adjacent signs. The panel 77 is provided with a "letter stroke" 82 which, as shown by way of example, represents a letter U. The stroke 82 may, of course, be made in other outlines to represent different letters or sign characters and, as shown in Fig. 8, is raised from the plane of the panel. The character stroke 82 has arcuate inclined side walls 83 and a central, concave, recess or reflector portion 84. Disposed within the reflector portion 84 is a fluorescent tube 85 which follows the contour of the character stroke. The outer surfaces of the side walls 83 also provide reflectors which reflect rays of light emanating from other portions of the fluorescent tube 85 or from other tubes of the sign or from nearby signs as indicated by the broken lines in Fig. 8. The light tube 85 is so disposed in the character stroke 82 that a portion of the rays of light transmitted thereby are directed laterally and, as explained above, may be projected against the curved surfaces of the side walls of adjacent character strokes to be reflected thereby. These rays of light are deflected by the outer edges 86 of the stroke 82 so that they do not directly strike the surface of the panel 77. By forming the surface of the panel 77 with the pillows 80 and recesses 81, any light striking the surface of the sign panel 77 is effectively diffused so that the sign character formed by the fluorescent tube 85 remains clear and well defined on the sign, and the reflection of secondary images from the surface of the sign is avoided.

Figure 9:
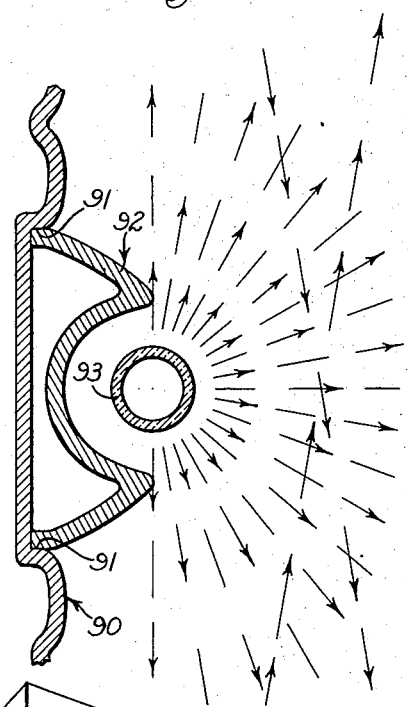
Fig. 9 is a view similar to Fig. 8, showing an alternative construction.

Fig. 9 shows a construction in which the cast panel 90 is provided with a recess 91 of the general outline of the sign character to be mounted on the panel. In this embodiment, a separate letter stroke element 92 is seated in the recess 91 and is secured therein by any suitable means (not shown). The element 92 is of substantially the same cross-sectional shape as the stroke portion 82, previously discussed in connection with the sign panel illustrated in Figs. 7 and 8, and located partially within the element is a fluorescent tube 93.

Figure 10:
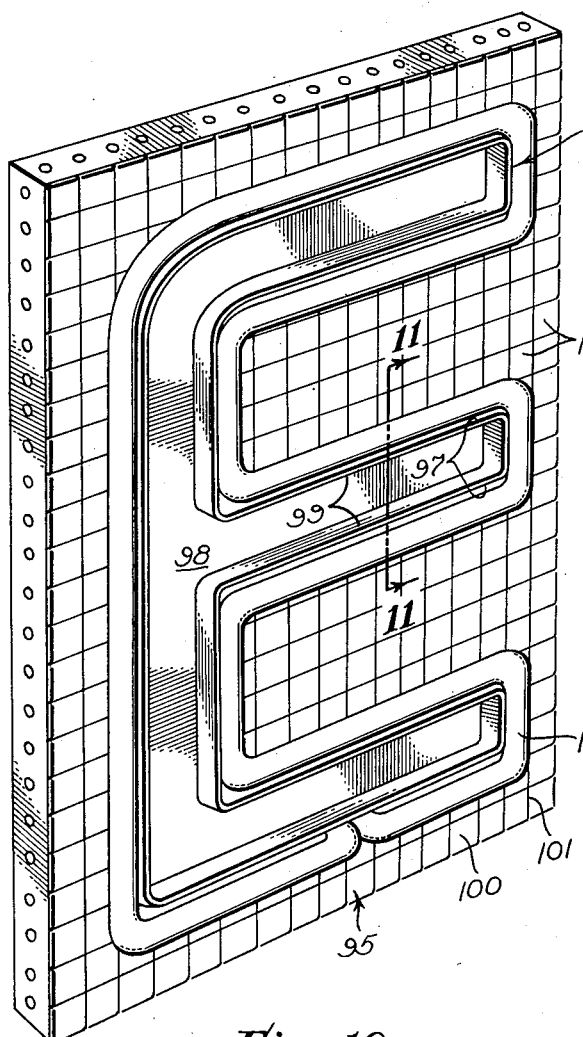
Fig. 10 is a perspective view of a face panel of a further modified type in which the illuminating tubes provide a letter outline.
Figure 11:
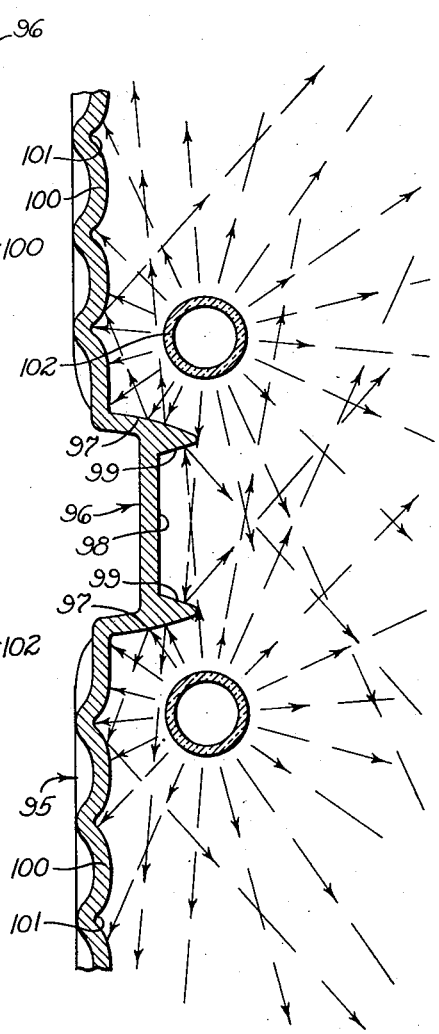
Fig. 11 is a cross-sectional view, taken on line 11—11 of Fig. 10.

Referring now to Figs. 10 and 11, the invention contemplates the provision of a further modified type of sign panel 95 wherein the character stroke 96 is formed as a raised portion of the cast metal panel. The raised letter stroke 96 has curved sides 97 which serve as reflectors, and a central depression 98, the sides 99 of which also form reflectors. The surface of the panel 95 may be provided with raised square pillows 100 which are separated by grooves 101. The character stroke 96, which is shown by way of example as cast in the form of a letter E, is bordered by a fluorescent tube 102 which follows the outline of the letter and which is spaced forwardly from the front of the panel, as shown in Fig. 11. Preferably the tube 102 is mounted so that its center is substantially in alignment with the outer extremity of the character stroke 96. By this arrangement, only a small portion of the light transmitted by the tube 102 is directed into the recess or depression 98, the major portion of the light being directed outwardly from the sign as indicated by the broken lines in Fig. 11. It will be observed that some of the light rays strike the curved surfaces of the sides 99 and are reflected thereby. Other light rays emanating from the light tube 102 strike the pillows 100 and are diffused thereby. The illuminated sign character shown in Figs. 10 and 11 is of the type usually referred to as an outline letter since the fluorescent tube 102 forms the outline of the character. It will be noted that since most of the light rays transmitted by the tube 102 are directed outwardly and prevented from entering the space, or stroke, between the parallel portions of the illuminating tube, the appearance of the light from portions of the tube merging into a single wide beam, especially when viewed from a distance, is effectively avoided. This constitutes an important improvement over conventional illuminated signs wherein the light transmitted by the tubes is reflected by portions of the surface of the sign between the tubes so that clear, well defined characters are practically unobtainable. By providing the surface of the sign panel with the convex pillows 100 and grooves 101, the light rays transmitted to portions of the sign are effectively diffused thereby. Consequently, the sign may be coated with vitreous or porcelain enamel, or any other hard and durable material having a smooth, glassy surface, without increasing the reflectibility of the surface of the sign.

While the improved sign has been hereinshown and described as embodied in certain specific constructions, by way of example, it will be apparent that the sign may be modified in certain respects within the concept of our invention. Consequently, we do not wish to be limited in this respect, but desire to be afforded the full scope of the appended claims.

We claim as our invention:

1. An illuminated sign including: a plurality of panel members bound together adjacent their edges, certain of said members having integral raised stroke portions projecting from a face thereof and defining sign characters of selected design, the sides of said stroke portions being inclined; and illuminating means mounted on each of said certain members and bordering the stroke portions thereof so as to form an outline of the sign character, said illuminating means being mounted in a plane extending parallel to the face of the respective member, said plane intersecting the portions of the stroke portions disposed most remotely from said face so that the major portion of the light rays emanating from the illuminating means is projected to and reflected by the face of the member and the inclined sides of said stroke portions.

2. An illuminated sign including: a plurality of panel members bound together adjacent their edges, certain of said members having integral raised stroke portions projecting from a face thereof and defining sign characters of selected design, the sides of said stroke portions being inclined and the outer faces thereof having depressions provided with inclined reflector surfaces; and illuminating means mounted on each of said certain members and bordering the stroke portions thereof so as to form an outline of the sign character, said illuminating means being mounted in a plane extending parallel to the face of the respective member, said plane intersecting said outer faces of said stroke portions so that the major portion of the light rays emanating from the illuminating means is projected to and reflected by the face of the member and the inclined sides of said stroke portions and a minor portion of the light rays being transmitted to and reflected by said reflector surfaces.

3. A rigid sign-box structure adapted for attachment to a support, including: a pair of rigid, opposite parallel side members providing the side walls of the structure; a plurality of transverse spreader members rigidly connected between said side members at spaced intervals throughout their areas for holding the same in spaced relationship; at least one hanger member connected to certain of said spreader members within the confines of said side members by which the structure can be attached to the support, said hanger member having an end projecting beyond said side members, certain of said members having integral raised stroke portions projecting from a face thereof and defining sign characters of selected design, the sides of said stroke portions being inclined; and illuminating means mounted on each of said certain members and bordering the stroke portions thereof so as to form an outline of the sign character, said illuminating means being mounted in a plane extending parallel to the face of the respective member, said plane intersecting the portions of the stroke portions disposed most remotely from said face so that the major portion of the light rays emanating from the illuminating means is projected to and reflected by the face of the member and the inclined sides of said stroke portions.

4. A rigid sign-box structure adapted for attachment to a support, including: a pair of rigid, opposite, parallel side members providing the side walls of the structure; a plurality of transverse spreader members rigidly connected between said side members at spaced intervals throughout their areas for holding the same in spaced relationship; at least one hanger member connected to certain of said spreader members within the confines of said side members by which the structure can be attached to the support, said hanger member having an end projecting beyond said side members, certain of said members having integral raised stroke portions projecting from a face thereof and defining sign characters of selected design, the sides of said stroke portions being inclined and the outer faces thereof having depressions provided with inclined reflector surfaces; and illuminating means mounted on each of said certain members and bordering the stroke portions thereof so as to form an outline of the sign character, said illuminating means being mounted in a plane extending parallel to the face of the respective member, said plane intersecting said outer faces of said stroke portions so that the major portion of the light rays emanating from the illuminating means is projected to and reflected by the face of the member and the inclined sides of said stroke portions and a minor portion of the light rays being transmitted to and reflected by said reflector surfaces.

HAROLD R. OWEN.
RALPH BROWN.

References Cited in the file of this patent

UNITED STATES PATENTS

| Number | Name | Date |
| --- | --- | --- |
| D. 79,024 | Gottlieb | July 23, 1929 |
| 706,525 | Butt | Aug. 12, 1902 |
| 798,191 | Lamb | Aug. 29, 1905 |
| 1,308,157 | Balogh et al. | July 1, 1919 |
| 1,654,350 | Shelton | Dec. 27, 1927 |
| 1,693,059 | Shulhof | Nov. 27, 1928 |
| 1,792,124 | Schaefer | Feb. 10, 1931 |
| 1,820,913 | Kelly et al. | Sept. 1, 1931 |
| 1,866,534 | Janin | July 12, 1932 |
| 1,918,570 | Sheras | July 18, 1933 |
| 2,005,757 | Scott | June 25, 1935 |
| 2,024,077 | Thomas | Dec. 10, 1935 |
| 2,079,707 | Gordon et al. | May 11, 1937 |
| 2,113,026 | Kehl | Apr. 5, 1938 |
| 2,114,550 | Vandermeer | Apr. 19, 1938 |
| 2,141,955 | Lang | Dec. 27, 1938 |
| 2,336,788 | Hotchner | Dec. 14, 1943 |

FOREIGN PATENTS

| Number | Country | Date |
| --- | --- | --- |
| 8,257 | Great Britain | Apr. 11, 1904 |
| 107,622 | Australia | June 2, 1939 |
| 126,341 | Austria | Jan. 11, 1932 |
| 350,542 | Great Britain | June 15, 1931 |
| 823,392 | France | Oct. 18, 1937 |